(12) United States Patent
Lee et al.

(10) Patent No.: US 9,580,612 B2
(45) Date of Patent: *Feb. 28, 2017

(54) ALUMINUM CHELATE METHOD FOR MANUFACTURING THE SAME, AND PHOTO CURED INK INCLUDING THE SAME

(71) Applicant: JETCOAT CORPORATION, Taoyuan County (TW)

(72) Inventors: Ming-Ta Lee, Taoyuan County (TW); Bo-Chih Lin, Taoyuan County (TW); Kuo-Jiun Liu, Taoyuan County (TW); Wei-Ping Lin, Taoyuan County (TW)

(73) Assignee: Jetcoat Corporation, Tauyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/098,746

(22) Filed: Apr. 14, 2016

(65) Prior Publication Data

US 2016/0230029 A1   Aug. 11, 2016

Related U.S. Application Data

(62) Division of application No. 14/549,968, filed on Nov. 21, 2014, now Pat. No. 9,340,687.

(30) Foreign Application Priority Data

May 21, 2014   (TW) .............................. 103117822 A
Jul. 17, 2014   (TW) .............................. 103124498 A
Jul. 24, 2014   (TW) .............................. 103125220 A

(51) Int. Cl.
*C09D 11/101*   (2014.01)
*C09D 11/037*   (2014.01)
*C09D 11/03*   (2014.01)
*C09D 11/08*   (2006.01)
*C08J 3/24*   (2006.01)
*C08K 3/00*   (2006.01)
*C08K 5/00*   (2006.01)
*C09D 11/12*   (2006.01)

(52) U.S. Cl.
CPC ............... *C09D 11/101* (2013.01); *C08J 3/24* (2013.01); *C08K 3/00* (2013.01); *C08K 3/0033* (2013.01); *C08K 5/00* (2013.01); *C08K 5/0008* (2013.01); *C09D 11/03* (2013.01); *C09D 11/037* (2013.01); *C09D 11/08* (2013.01); *C09D 11/12* (2013.01); *C08J 2393/04* (2013.01)

(58) Field of Classification Search
CPC ...... C09D 11/101; C09D 11/037; C09D 11/03
USPC .................................................. 524/517, 558
See application file for complete search history.

(56) References Cited

U.S. PATENT DOCUMENTS 9,340,687 B2 *   5/2016   Lee .................... C09D 11/08

* cited by examiner

*Primary Examiner* — Porfirio Nazario Gonzalez
(74) *Attorney, Agent, or Firm* — Rosenberg, Klein & Lee

(57) ABSTRACT

An aluminum chelate, a method for manufacturing the same and a photo cured ink including the same are revealed. First rosin resin is modified by epoxy and acrylic acid to get acrylic acid modified rosin resin. Then an aluminum chelating agent undergoes a chelation reaction with the acrylic acid modified rosin resin to form a plastic fluid whose chemical structure contains a photoreactive group and a chelate structure with aluminum. The plastic fluid can be added into photo cured inks so that the photo cured inks have better ink tack, ink flow, color density and stability.

1 Claim, 4 Drawing Sheets

ALUMINUM CHELATE METHOD FOR MANUFACTURING THE SAME, AND PHOTO CURED INK INCLUDING THE SAME

CROSS-REFERENCE TO RELATED APPLICATION

This application is being filed as a Divisional application of Ser. No. 14/549,968, filed 21 Nov. 2014. Which claims the benefit of Taiwan Patent Application No. 103117822, filed 21 May 2014, Taiwan Patent Application No. 103125220, filed on 24 Jul. 2014, Taiwan Patent Application No. 103124498, filed on 17 Jul. 2014, which is incorporated by reference herein.

FIELD OF THE INVENTION

The present invention relates to a chelate and a method for manufacturing the same, especially to an aluminum chelate. There's also a method for manufacturing the same applied to photo cured inks and a photo cured ink including the aluminum chelate.

BACKGROUND OF THE INVENTION

UV curing coatings have been developed during the 1970s. It is an environmentally friendly green technology with many advantages. No environmental pollution is caused because of no organic solvent evaporated during curing. At the same time, it can reduce energy waste during curing, shorten the production time, and the quality is much easy to control.

In the beginning, UV cured inks are not acceptable in industry. Along with development of photoinitiators and diluents with bifunctional group or multi-functional group, UV cured inks are gradually acceptable at last Besides wide raw material sources allowing easy preparation of UV coatings with difference properties by factories, photoinitiation of UV curing provides a fast curing process and shorter production time. The curing reaction is carried out according to user's requirements so that preparation process is more flexible. Moreover, the UV cured ink contains no organic solvent and no heating is required. These features make processing of heat-sensitive electronic materials in the clean room become feasible.

Generally, the UV cured ink includes three main components. The first is oligomer that features on no odor, excellent curing property and low toxicity. The oligomer is a prepolymer comprising multiple repetitions of units and having molecular weight between small molecular monomer and high molecular polymer. The oligomer is a main chemical involved in photo curing and having great effects on various properties of the cured ink including mechanical property, chemical property, physical property, etc.

The second component is reactive monomer which features on photo-reactivity, good curing rate and low viscosity. Due to low molecular weight and low viscosity of the monomer, the reactive monomer can replace the solvent to be added in to oligomer and used as a diluent. Thus the viscosity of the ink is reduced and is easy to be processed. The most common used reactive monomers include vinyl monomer, propenyl monomer, and acrylic acid monomer. According to the number of functional group contained, the monomer can be divided into two groups-one is monomer with single functional group while the other is monomer with multiple functional groups. The monomer having a single functional group is with lower molecular weight and used as a diluent for viscosity reduction and modification of physical properties of cured body. Yet it's less used now due to high volatility and bad smell. As to the monomer with multiple functional groups, it has faster reaction rate and higher crosslinking density. Thus the hardness after curing is higher.

The third is photoinitiator that features on absorption of UV radiation energy, initiation of polymerization, and good thermal stability. The active form of the photoinitiator varies according to the structure, divided into two groups-free radicals and radical cations. After absorbing UV light, free radicals or radical cations are generated and react with monomers as well as corresponding oligomer to carry out chain polymerization reaction. The composition and concentration of the photoinitiator have great effects on the time required for curing and the wavelength range in which the photoinitiator absorbs light.

Besides the above three main components, additive and color pigments for inks can also be used due to various requirements of ink performance and applications. The additive used is for achieving certain property or reducing operational flaws. The present invention features on that a novel aluminum chelate and a method for manufacturing the same are provided. After the novel aluminum chelate being added into photo cured inks, the properties of the photo cured inks are improved significantly.

SUMMARY

Therefore it is a primary object of the present invention to provide an aluminum chelate that is a plastic fluid with a gel-like appearance and having a photoreactive group as well as a chelate structure with aluminum. The aluminum chelate can be added into photo cured ink so that the photo cured ink has better tack, fluidity, color density and stability.

It is another object of the present invention to provide a method for manufacturing the aluminum chelate mentioned above and applied to photo cured inks.

It is a further object of the present invention to provide a photo cured ink including an aluminum chelate whose color density is significantly improved than the photo cured inks available now due to an aluminum chelate contained therein. The photo cured ink is also having good stability and is of great commercial value.

In order to achieve the above objects, an aluminum chelate, a method for manufacturing the same and a photo cured ink including the same are revealed. Modified rosin resin with dicarboxylate is modified by epoxy and acrylic acid to get acrylic acid modified rosin resin. Then an aluminum chelating agent undergoes a chelation reaction with the acrylic acid modified rosin resin to get a plastic fluid having a structural formula as following:

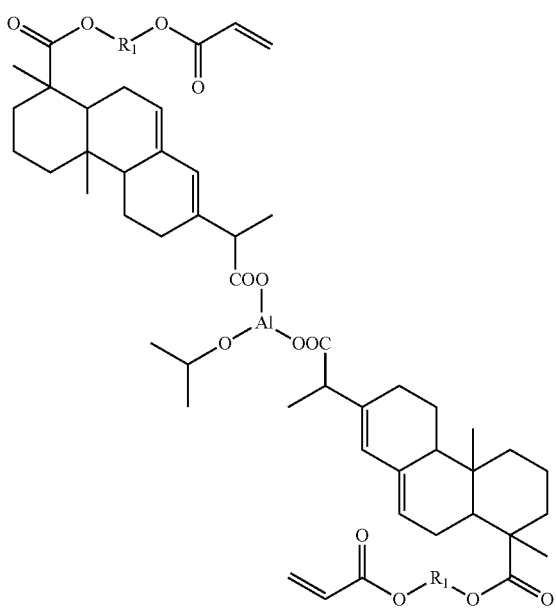

wherein $R_1$ is selected from the group consisting of:

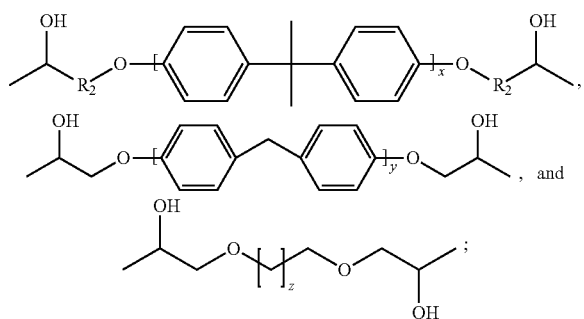

and $R_2$ is linear alkyl having from 1 to 5 carbon atoms, x is from 1 to 50, y is from 1 to 50, and z is from 1 to 19.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
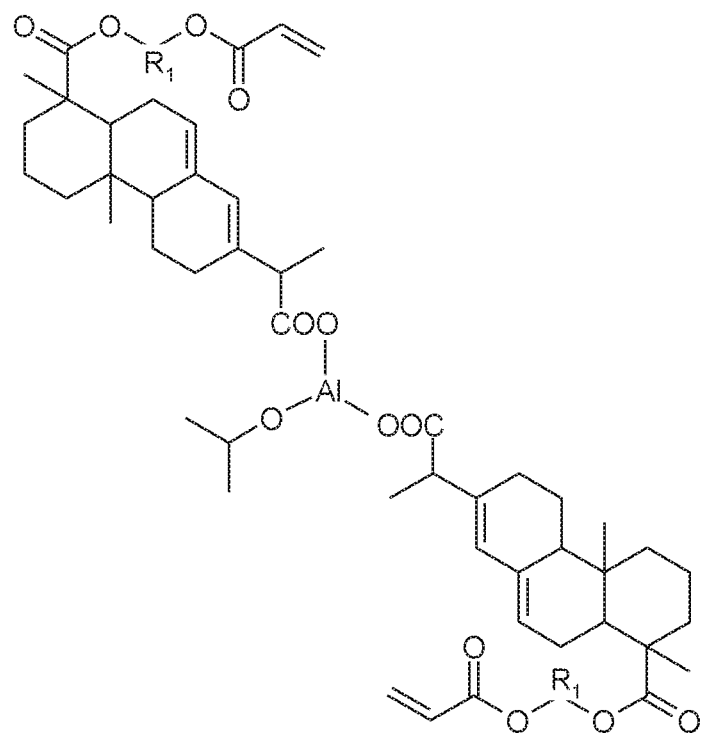
FIG. 1 is a structural formula of an aluminum chelate according to the present invention.

Refer to FIG. 1, an aluminum chelate of the present invention is a plastic fluid having an aluminum central atom and used as an addictive for photo cured ink for improving ink tack (adhesiveness), fluidity, and ink stability. The good color density is also maintained.

Figure 2:
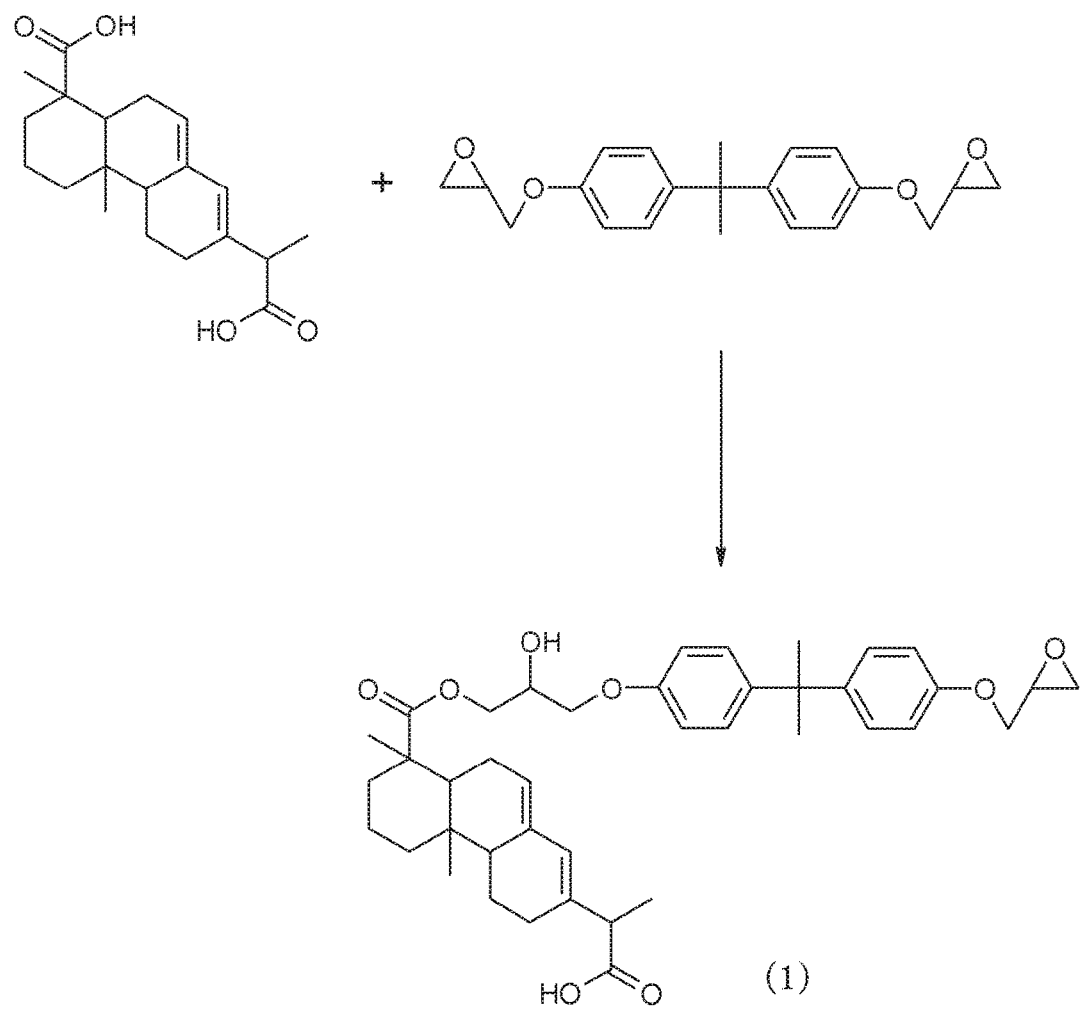
FIG. 2 shows a chemical reaction carried out in step S10 of a method for manufacturing an aluminum chelate according to a preferred embodiment of the present invention.
Figure 3:
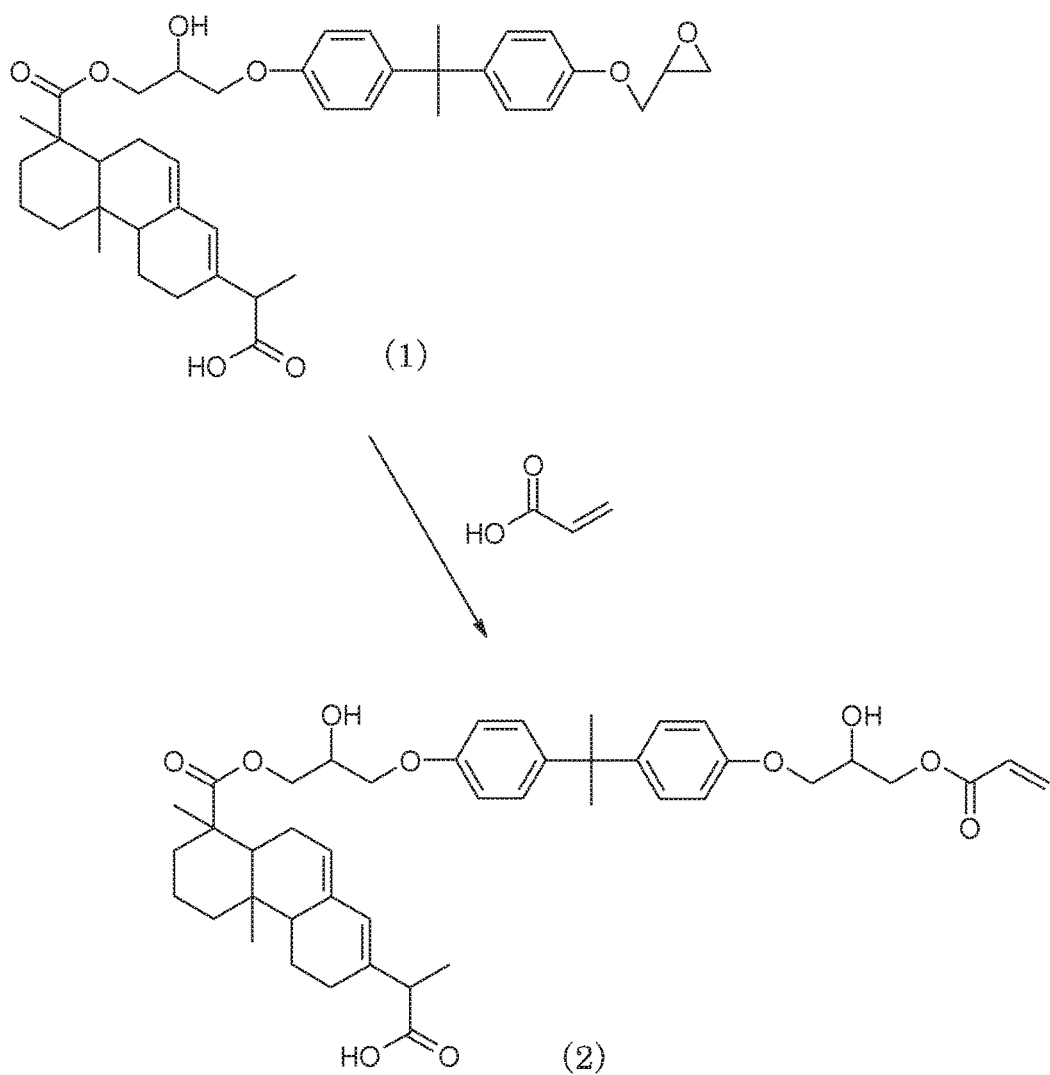
FIG. 3 shows a chemical reaction carried out in step S11 of a method for manufacturing an aluminum chelate according to a preferred embodiment of the present invention.
Figure 4:
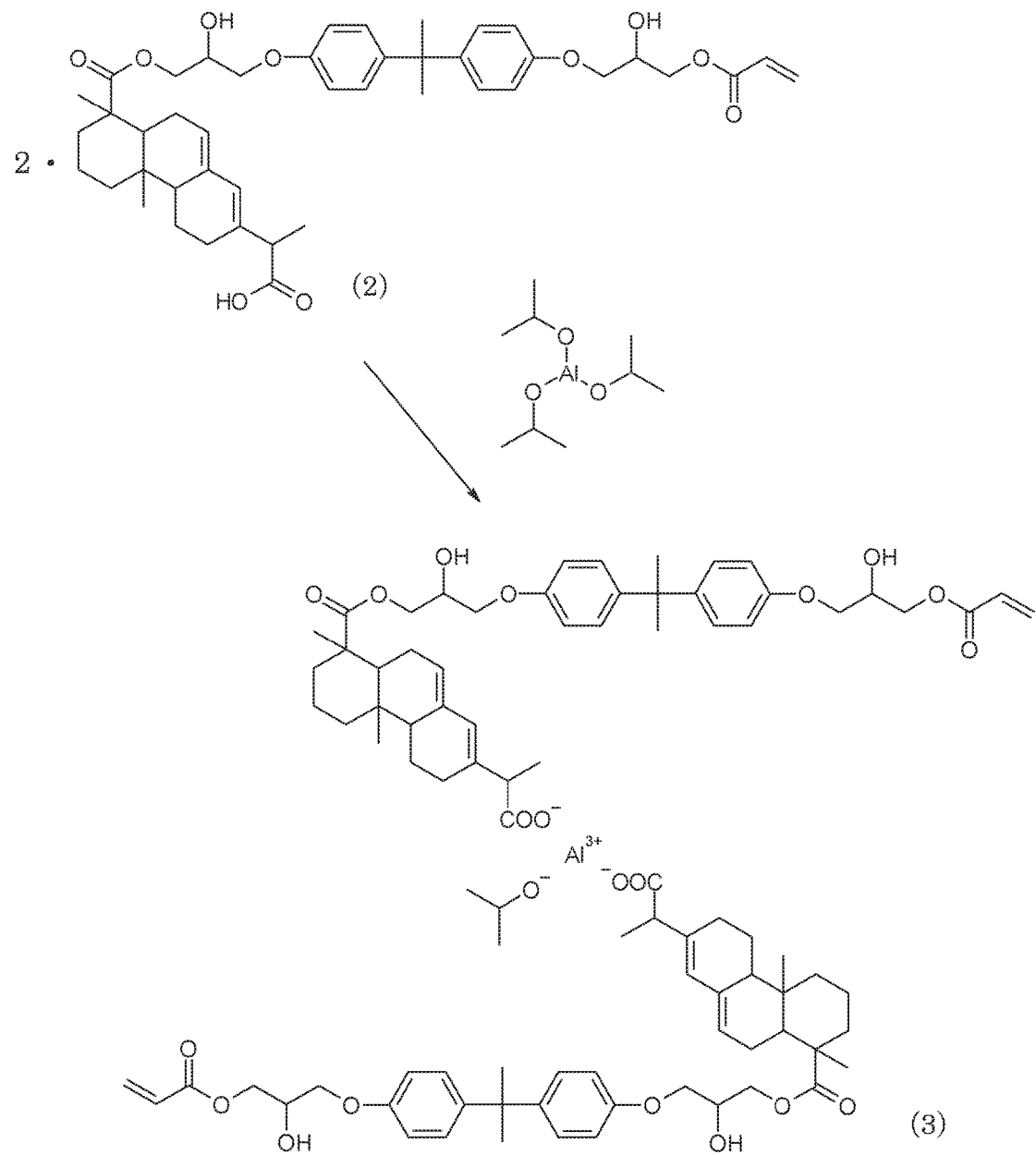
FIG. 4 shows a chemical reaction carried out in step S12 of a method for manufacturing an aluminum chelate according to a preferred embodiment of the present invention.

Refer to FIG. 2, FIG. 3 and FIG. 4, a method for manufacturing an aluminum chelate of the present invention comprising the steps of:

Step S10: use modified rosin resin with dicarboxylate to react with bisphenol A diglycidyl ether and get a product (1).

Step S11: take the product (1) to react with acrylic acid and get a product (2) that is acrylic acid modified rosin resin; and Step S12: add an aluminum chelating agent into the product (2) to make acrylic acid modified rosin resin undergo a chelation reaction with the aluminum chelating agent and get a product (3). The product (3) is the aluminum chelate of the present invention.

According to the above steps, the aluminum chelate obtained is a plastic fluid and gel-like substance used for modification of ink properties.

In the step 10, the modified rosin resin with dicarboxylate is used as the starting reactant, reacting with epoxy. In this embodiment, the epoxy used is bisphenol A diglycidyl ether while the modified rosin resin with dicarboxylate used is maleic modified rosin resin, however, the present invention can use bisphenol F diglycidyl ether, aliphatic diglycidyl ether, or aromatic diglycidyl ether instead, which are belong to diglycidyl ether group. Furthermore, the carbon atoms in the aliphatic diglycidyl ether is less than 20, and the carbon atoms in the aromatic diglycidyl ether is less than 600 in preferred embodiments.

aromatic diglycidyl ether, wherein $R_2$ is linear alkyl having from 1 to 5 carbon atoms, and x is from 1 to 50

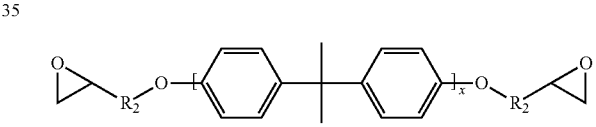

bisphenol F diglycidyl ether, wherein y is from 1 to 50

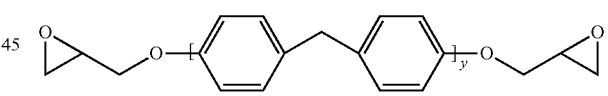

aliphatic diglycidyl ether, wherein z is from 1 to 19

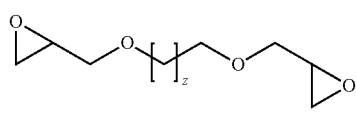

Dicarboxylic acid or acid anhydride is used to modify rosin resin for preparation of the modified rosin resin with dicarboxylate. The dicarboxvlic acid can be maleic acid mentioned above, also called cis-butenedioic acid, having two carboxyl groups. The dicarboxylic acid can also be saturated dicarboxylic acids, aromatic dicarboxylic acids, or unsaturated dicarboxylic acids used to modify rosin resin. The number of carbon atoms of the dicarboxylic acid is ranging from 2 to 10 and is able to be trans-butenedioic acid (fumaric acid), 2,4-hexadienedioic acid (muconic acid), ortho-phthalic acid (phthalic acid), tetrahydrophthalic acid, hexahydrophthalic acid, isophthalic acid, oxalic acid, propandioic acid (malonic acid) or adipic acid.

As to the acid anhydride, the number of carbon atoms of the acid anhydride ranging from 4 to 7 is preferred such as cis-butenedioic anhydride (maleic anhydride), trans-butenedioic anhydride, acetic anhydride, o-Phthalic anhydride, tetrahydrophthalic anhydride, hexahydrophthalic anhydride, etc.

In the step S11, besides acrylic acid, 1,6-hexandioldiacrylate (HDDA) can also be added. Mono methyl ether of hydroquinone (MEHQ) is used as an inhibitor while dimethylethanolamine (DMEA) is used as a catalyst. The reaction temperature of this step is 80~180 degrees Celsius (° C.), preferred at 120° C., and the reaction time is 3 hours.

After acrylic acid modified rosin resin being formed by using modified rosin resin with dicarboxylate (maleic modified rosin resin) to react with epoxy and acrylic acid to modify and before taking the step S12, the amount of the inhibitor MEHQ added can be increased depending on the situations (reaction conditions). Then the reaction temperature is maintained at 80~180° C., preferred at 140° C., for 30 minutes. Next oxoaluminum octoate used as aluminum chelating agent is added. The reaction temperature of chelation is 100~190° C., preferred at 140'C, and the reaction time is 1 hour.

The aluminum chelating agent used in the present invention is not limited to oxoaluminum octoate mentioned above. The aluminum chelating agent including following formula can be used in the present invention:

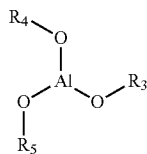

wherein $R_3$, $R_4$, and $R_5$ are an organic group respectively. For example, the product of American FEDChem such as manalox130, manalox360, etc. all having the above structure and able to be used as aluminum chelating agent in the present invention.

The following is an embodiment of the present invention. In practice, 100 g maleic modified rosin resin (EASTMAN KODAK Co., LEWISOL 28-M), 67.04 g bisphenol A diglycidyl ether (Chang Chung group BE-188, epoxy equivalent weight (EEW) 185 g), 30.8 g acrylic acid (Glacial acrylic acid (GAA) produced by *Formosa* plastic group) and 244 g HDDA are added into a 1-liter three neck flask. Moreover, 1.77 g MEHQ used as inhibitor and 1.0 g DMEA used as catalyst are also added. Then air is introduced into the mixture, stirred at 500 rpm and heated to 120° C. for 3 hours. Next 1.77 g MEHQ is added and the temperature is increased to 140° C. for 30 minutes. Then add 9.04 g oxoaluminum octoate (Fedchem LLC Manalox230) and the temperature is maintained at 140° C. for an hour. Later when the temperature is down to 70° C., the product discharged and obtained is an aluminum chelate of the present invention.

The aluminum chelate of the present invention is applied to photocured inks. The novel photo cured ink including a mixture of oligomer, reactive monomer, and photoinitiator has good properties. The tack, viscosity and yield value of the photo cured ink can be adjusted by the radio of the aluminum chelate.

The photo cured ink of the present invention is formed by following components: 0.1~5 percent of aluminum chelate by weight, 5~40 percent of polyester acrylate by weight, 13~26 percent of pigment by weight, 5~30 percent of modified epoxy acrylate by weight and the rest components including trimethylolpropane triacrylate (TMPTA), polypropylene wax, HYPER dispersant, photoinitiator mix, talc and glycerol(propylene oxide)triacrylate (GPOTA) less than 15 percent by weight.

The followings are test results of properties of three different kinds of photo cured ink prepared. Sample A doesn't include any substance with aluminum chelate. Sample B includes other chelate structure with aluminum different from the chelate structure with aluminum of the present invention while Sample C has an aluminum chelate revealed in and prepared by the present invention. The rest components are selected from the materials and their ranges mentioned above respectively and are the same in each sample. In other words, the three samples are only different in the aluminum chelate related substances and pigment while the rest components are all the same in each test sample. After all the above components being mixed, the mixture is stirred by a high speed agitator for 30 minutes and mixed 4 times by a cylinder. The test results of the samples are shown in the Table 1.

TABLE 1

|  |  | Sample A | Sample B | Sample C |
| --- | --- | --- | --- | --- |
| Yellow | Tack | 13.9 | 12.0 | 12.9 |
|  | Ink Flow | 2.70/2.87 | 2.80/2.90 | 2.84/2.90 |
|  | Color density | 112 | 118 | 116 |
|  | Stability (day) | 14 | 2 | 14 |
| Magenta | Tack | 18.2 | 16.1 | 17.2 |
|  | Ink Flow | 3.24/3.48 | 3.30/3.50 | 3.21/3.45 |
|  | Color density | 140 | 176 | 175 |
|  | Stability (day) | 14 | 2 | 14 |
| Cyan | Tack | 14.6 | 12.6 | 13.3 |
|  | Ink Flow | 3.20/3.37 | 3.30/3.52 | 3.30/3.51 |
|  | Color density | 160 | 165 | 164 |
|  | Stability (day) | 14 | 2 | 14 |
| Black | Tack | 16.3 | 14.5 | 15.2 |
|  | Ink Flow | 3.35/3.55 | 3.31/3.57 | 3.31/3.55 |
|  | Color density | 135 | 154 | 152 |
|  | Stability (day) | 14 | 1 | 14 |

Refer to Table 1, RIGO's Spread Meter is a parallel plate viscometer used for measuring fluidity of inks. This instrument is used to determine "spread" of ink. A certain amount of ink is placed into a specimen hole between two parallel plates and is scraped by a plastic scraper. Then glass plates are set on the rack to be fixed. After fixing bolts being pushed upward, start timing and the test time is 60 sec/120 sec respectively. Observe deformation of the ink caused by the glass plates. The ink spreads in circular shape and a diameter (mm) of the spread ink is measured. Yield value is determined from the ink spreading speed. The tack is tested by Thwing Albert inkometer Model 106. Ink is applied to a center area of a vibrator roller of the inkometer. The area is a circle of about 5 cm around the center of the roller and the amount of the ink is usually about 1.32 cc. Then perform the test. As to color density measurement, AKIRA RI-2 tester for color proof, setting is used. The ink is evenly applied to 70 mm*15 mm white synthetic paper. In the stability test, 50.0 g prepared ink is set into a 0.1 L black polypropylene (PP) bottle and sealed. Then the bottle is put into a thermostatic oven set at 60° C. Use a glass rod to check whether there is mass in the ink each day. If the answer is no, record the day and continue the test until day 14.

Compared with the substance having no aluminum chelate (Sample A), the color density of the color inks with the aluminum chelate of the present invention is significantly increased. As to the Sample B with the substance having other chelate structure with aluminum, it also has improved color density but its stability is dramatically reduced. After being set at room temperature after 3-4 weeks, gelation occurs in Sample B. Thus Sample B can't be commercialized. Thus not all kinds of aluminum chelates are suitable for inks. Only the photo cured inks added with the aluminum chelate prepared by the present invention have good tack, ink flow, color density and stability.

In summary, the present invention reveals an aluminum chelate, a method for manufacturing the same, and a photo cured ink including the same. Modified rosin resin with dicarboxylate is modified by epoxy and acrylic acid to get photo cured acrylic acid modified rosin resin. Then an aluminum chelating agent is reacted with the acrylic acid modified rosin resin to carry out a chelation reaction and get a planographic printing ink. This ink is a plastic fluid cured after being radiated by UV light. Not only tack, viscosity and yield value of the photo cured ink can be adjusted, the photo cured ink also has good performance on color density and stability. Thus an aluminum chelate, a method for manufacturing the same, and a photo cured ink including the same of the present invention are with high economic values.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A photo cured ink including an aluminum chelate comprising:
   0.1~5 percent of the aluminum chelate by weight;
   5~40 percent of polyester acrylate by weight;
   13~26 percent of pigment by weight;
   5~30 percent of modified epoxy acrylate by weight; and
   the rest including trimethylolpropane triacrylate (TMPTA), polypropylene wax, HYPER dispersant, photoinitiator mix, talc and glycerol(propylene oxide) triacrylate (GPOTA) less than 15 percent by weight.

* * * * *